No. 615,201. Patented Nov. 29, 1898.
F. H. RICHARDS.
AUTOMATIC WEIGHING MACHINE.
(Application filed Mar. 26, 1898.)

(No Model.) 4 Sheets—Sheet 2.

Fig. 2.

Witnesses:
G. B. Rowley.
Fred J. Dole.

Inventor:
F. H. Richards.

No. 615,201. Patented Nov. 29, 1898.
F. H. RICHARDS.
AUTOMATIC WEIGHING MACHINE.
(Application filed Mar. 26, 1898.)

(No Model.) 4 Sheets—Sheet 3.

Fig.3.

Witnesses:
G. B. Rowley.
Fred. J. Dole.

Inventor:
F. H. Richards

THE NORRIS PETERS CO., PHOTO-LITHO., WASHINGTON, D. C.

No. 615,201. Patented Nov. 29, 1898.
F. H. RICHARDS.
AUTOMATIC WEIGHING MACHINE.
(Application filed Mar. 26, 1898.)

(No Model.) 4 Sheets—Sheet 4.

Fig. 4.

Witnesses:
G. B. Rowley.
Fred. J. Dole.

Inventor:
F. H. Richards.

10
UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 615,201, dated November 29, 1898.

Application filed March 26, 1898. Serial No. 675,264. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines for automatically weighing and delivering various kinds of material.

The invention includes in the present case as one of its features and in combination with stream-supplying means and a force-feeder a device in position to be acted upon by the supply and adapted to throw the force-feeder out of operative relation with its driving mechanism and means for automatically controlling the operation of said device. The driving mechanism for the force-feeder, constituting a part of the supply apparatus, preferably includes a coupling device or clutch, the members of which are held in engagement by means including an electrically-operated device, such as a magnet, and the feeder and its shaft are shiftably mounted, so that by shifting the same the feeder can be stopped or started. A lever is preferably provided for shipping the movable member of the coupling device, fixed, preferably, to the feeder-shaft, and said lever carries the armature of the electromagnet, and when the latter is energized the lever will be moved into position to hold the two members of the clutch in engagement. When the load-receiver contains the predetermined charge, the electromagnet will be deënergized, so that the clutch-shipping lever will be released, whereby the mass constituting the supply can act against the device before mentioned, and the pressure of the material will shift said device, thereby disengaging the movable member of the clutch from its companion, so as to stop the force-feeder, and the mechanism for operating and throwing the force-feeder out of action is controlled, preferably, by the weighing mechanism, by reason of which the force-feeder can be automatically started and stopped, respectively, at the commencement and close of a weighing operation.

Another object of the invention is to combine with weighing mechanism a device which may be mounted on the weighing mechanism and which serves to force material therefrom, driving mechanism for said material-forcing device, load-discharging means, and mechanism for throwing the load-discharging means into operative connection with said driving mechanism, whereby the load can be promptly discharged. The load-discharging means involves, preferably, a latch which is automatically thrown into operative relation with the driving mechanism on the completion of a load, so that the latch will be tripped to release the closer mechanism or similar means, and the material-forcing device operates, preferably, in conjunction with overloading means, it serving positively to remove the surplus from the load-receiver which had previously been supplied by the overloading means, and the latch is preferably thrown into engagement with the driving mechanism by electrically-operated means including a device which is energized when the surplus is entirely withdrawn from the load-receiver.

In the drawings accompanying and forming part of this specification.

Similar characters designate like parts in all the figures of the drawings.

The weighing mechanism, consisting of a load-receiver and supporting beam mechanism, may be supported from the floor A by a set of hangers, as 2, secured to the floor and each having a V-shaped bearing 3, upon which the pivot 4 on the arms of the scale-beams B and B' are mounted, the arms of the beams being joined by counterweights, as W and W', respectively, and passing through the elliptical portion 6 of the several hangers 2.

The load-receiver is designated by G, and it preferably has on its opposite side the brackets 7, to which the links 8 are pivoted, said links having V-shaped portions 9 at their upper ends, resting on the coöperating knifeedges 10 at the inner or poising ends of the arms of the two beams, the weights W and W' of which normally rest, respectively, upon the laterally-extending arms 12 and 12', fixed to the front and rear sides of the load-receiver G.

Figure 1:
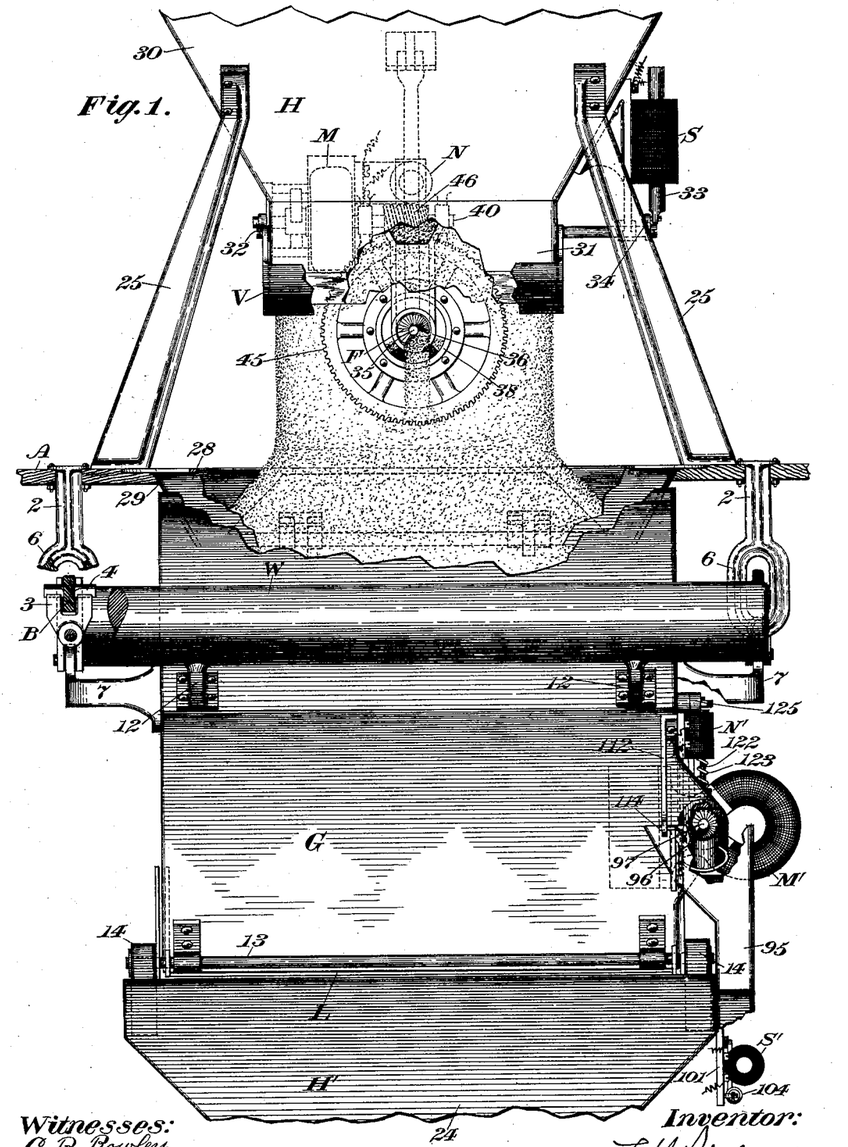
Figure 1 is a front elevation of my improved machine.
Figure 2:
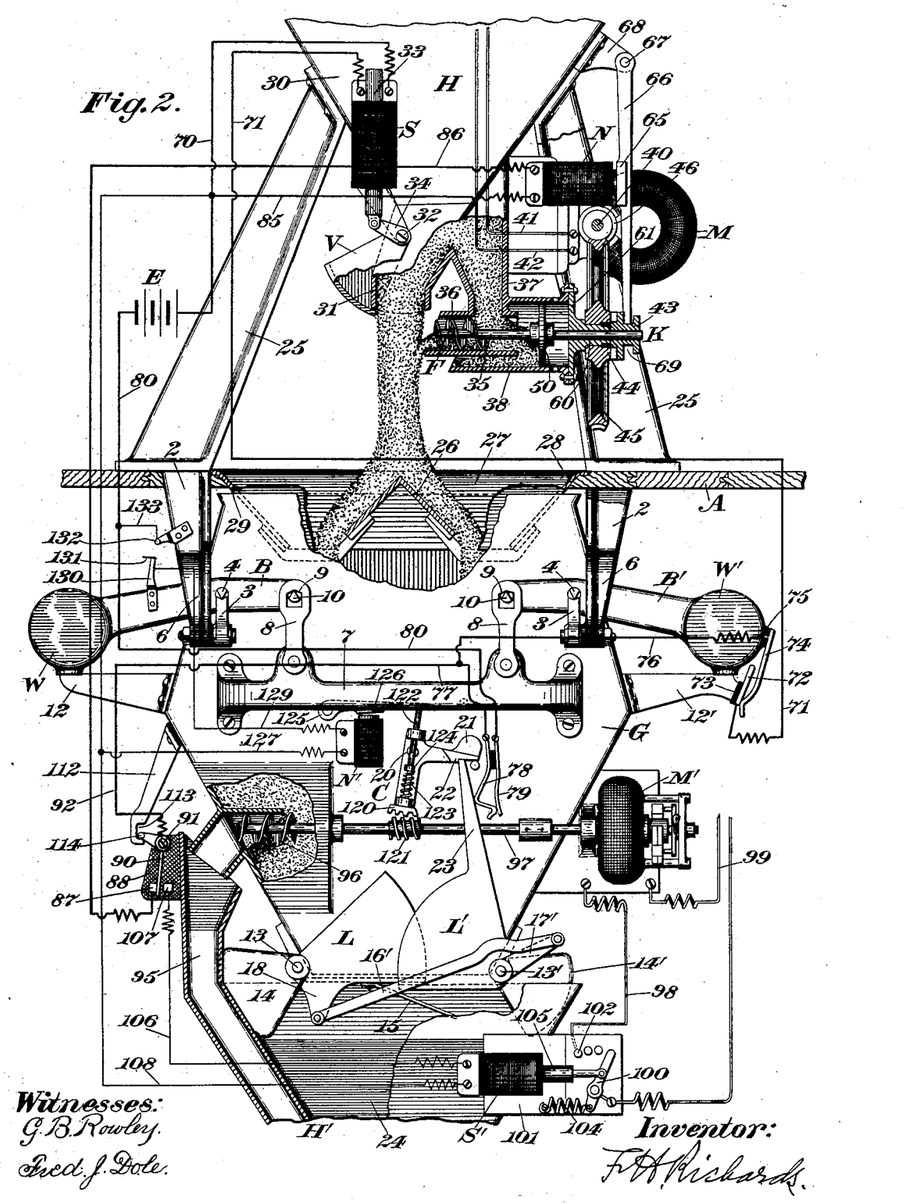
Fig. 2 is a side elevation as seen from the right in Fig. 1, illustrating a full volume of the supply flowing into the load-receiver.

The load-discharging means includes, preferably, a latch and one or more closers, the latch serving to hold the closer or closers shut and the latter being adapted to cover the discharge-outlet of the load-receiver. In the present case I have illustrated two closers, (designated, respectively, by L and L',) they being pivoted, as at 13 and 13', to opposite sides of the load-receiver and counterweighted, as at 14 and 14', the counterweights serving to shut the closers on the discharge of the load, and the closer L' overlaps the closer L, as indicated in Fig. 2, and the latter is provided with the usual regulator 15. The closers are connected for simultaneous movement by the link 16', pivoted to the crank-arm 17', fixed to the closer-pivot 13', and also to the depending arm 18 of the closer L.

The closer-holding latch is designated by C, and in the present case it consists of a lever pivoted, as at 20, to the load-receiver, and the weighted arm 21 thereof is shouldered, as at 22, to engage the arm 23 of the closer L', as indicated in Fig. 2, to hold said closer and its companion shut. When the latch is raised sufficiently far to disengage the weighted arm 21 from the closer-arm 23, the two closers will be released and can be forced open by the weight of the load in the load-receiver, and the load will be discharged into the chamber 24 of the hopper H', conveniently secured below the load-receiver G.

I have described a well-known type of weighing mechanism and means for controlling the discharge of a load, and it is to be understood that the invention is not limited to the construction set forth, as the load-receiver might be otherwise supported and the load-discharging means might be of some other character than that specified.

My improved machine includes means for supplying an overload to the load-receiver G of the weighing mechanism, the surplus being withdrawn by load-reducing means, and the supply apparatus H constitutes a convenient means for supplying an overload, said supply apparatus being supported by a series of posts 25, fixed, respectively, thereto and to the floor A and having means for supplying a series of streams, one of which is fed into the load-receiver by gravity and the other of which is positively delivered by a force-feeder.

As just stated, my improved supply apparatus includes means for delivering two separate streams of material to the load-receiver, one of them being supplied by gravity and the other being positively fed into said load-receiver, and by this organization should the first-mentioned stream fail to properly flow the supply to the load-receiver of an overload is insured by the force-feeding means, this feature being particularly advantageous in weighing materials which ordinarily flow freely but which tend at times to clog or stick in the supply apparatus. The two streams merge in one and then strike the substantially V-shaped break-plate 26, fixed between the opposite walls 27 of the hopper 28, secured in the opening 29 in the floor A and disposed within the upper side of the load-receiver.

The supply apparatus H includes a hopper 30, having the spout 31, from which a stream of material can gravitate and which is controlled by a stream-controller preferably consisting of a valve V of the "pan" type, pivoted, as at 32, to the spout 31 and being adapted to close by its own weight when released on the completion of the load, at which time it swings under the spout 31 to cut off the stream issuing therefrom.

The stream-controller or valve V may be held in its wide-open position by an electrically-operated device, such as the solenoid S, the core 33 of which is pivoted to the crank-arm 34 of the valve, and the organization of the parts is such that when the solenoid S is energized the valve V by reason of its connection with the solenoid-core 33 will be held wide open, as just stated and as indicated in Fig. 2. On the deënergization of the solenoid S the valve V will be released and can swing by its own weight under the outlet of the spout 31.

Figure 3:
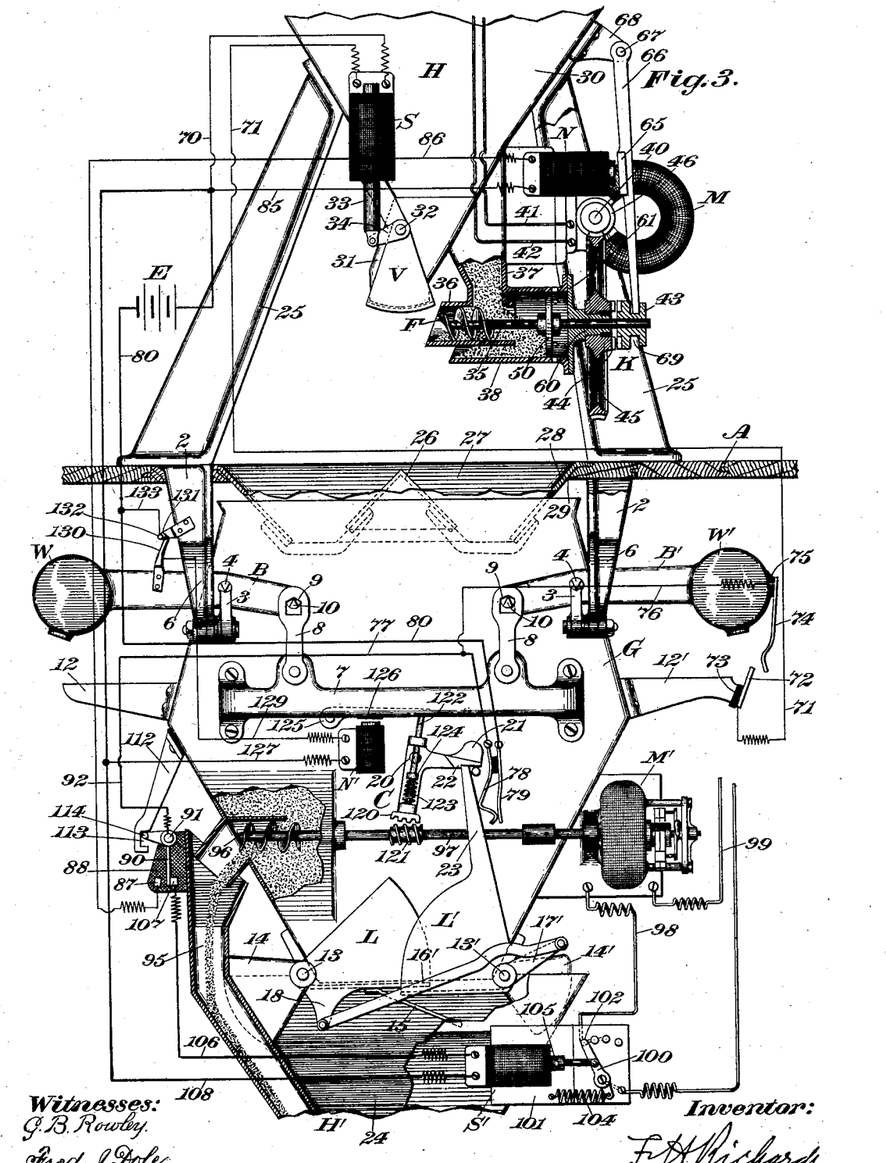
Fig. 3 is a similar view, the main supply being shown cut off and the force-feeder being in operation to effect the removal of the surplus.
Figure 4:
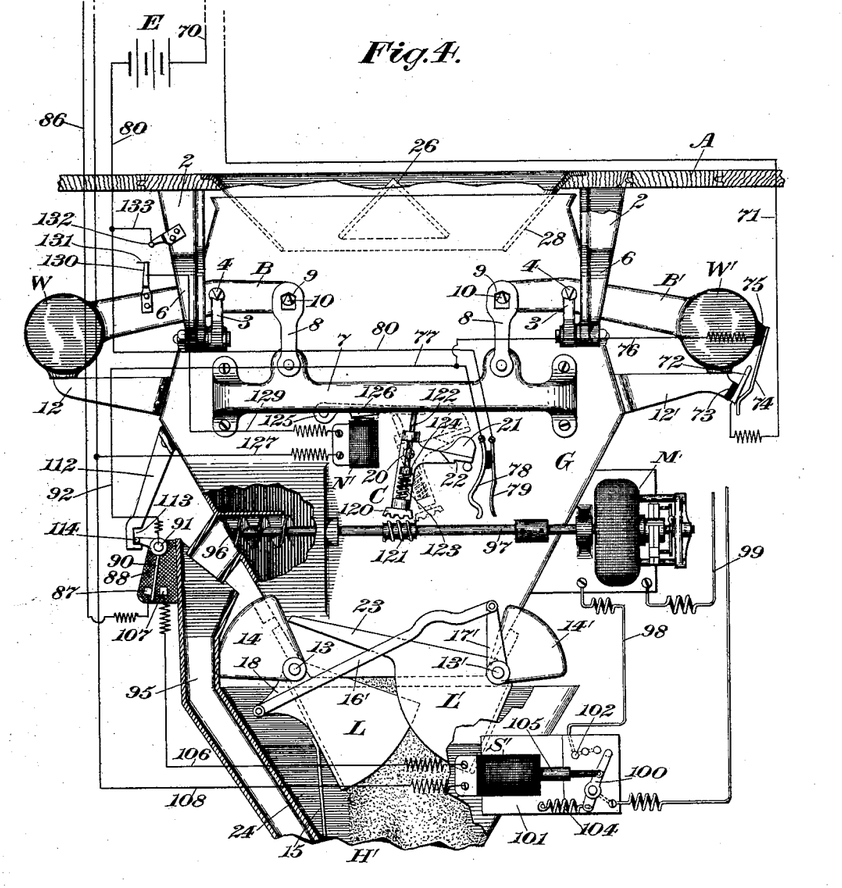
Fig. 4 is a similar view of the weighing mechanism, showing the closers open and the load being discharged.

The supply apparatus includes also a feeder, which may be of any suitable type, it consisting in the present case of a screw fixed to the shaft 35, shiftably mounted for a purpose that will hereinafter appear and located within the tubular spout 36, communicating with and located transversely below the spout 37 of the hopper 30, the tubular or cylindrical spout 36 being disposed in the larger cylindrical spout 38, communicating therewith and fixed to the hopper 30, as shown clearly in Figs. 2 and 3.

The feeder-driver mechanism includes a preferably continuously-operable shaft 40, which may be driven from the electromotor M, mounted upon a post 25 and supplied with the necessary current by wires 41 and 42, and a clutch, as K, the movable member 43 of which is fixed to the conveyer-shaft 35 and the other member 44 of which is fixed to the worm-gear 45, meshing with the worm 46 on the continuously-operative shaft 40, and it will be apparent that when the two members of the clutch constituting part of the driving mechanism are in engagement and when the motor M is in operation the shaft 40, and consequently the feeder-shaft 35, will be rotated, so that the feeder or conveyer F can force a supply of material from the tubular spout 36, received from the supply-spout 37, into the load-receiver G.

In connection with the force-feeder F, I provide a device such as the disk 50, situated in the cylindrical horizontal spout 38, and said device or disk serves to shift the movable clutch member 43 out of engagement with the fixed clutch member 44 on the worm-gear 45, rotatively mounted upon the hub 60, extending from the cap 61, which closes the rear side of the cylindrical spout 38. The two members of the clutch are held in engagement for a predetermined period by means acting in opposition to the clutch-shifting device 50, and when the clutch member 43 is released the pressure of material descending from the spout 37 and spout 36 into the spout 38 is sufficient to force the disk rearward, by reason of which the shaft 35, to which the disk is secured, will be correspondingly moved, as will also the clutch 43, which is secured to said shaft, and the diameter of the disk materially exceeds that of the feeder-screw F, so that this operation is assured, and both the disk and the feed-screw are loosely fitted in the spout, so that the parts can freely reciprocate longitudinally.

The clutch member 43 is preferably maintained in engagement with its companion by means involving an electromagnet N, the armature 65 of which is fixed to the clutch-lever 66, pivoted, as at 67, to the lug 68 on the hopper 30, and the free end of which fits in the channel 69 on the clutch member 43. When the magnet N is energized, its armature 65 will be attracted, as represented in Fig. 2, so that the movable member of the clutch is thrown into engagement with its mate, and as soon as said magnet is deënergized the pressure of the material in the supply apparatus will act against the disk 50 to force the same, and consequently the clutch member 43, rearward to uncouple the latter from the complementary clutch member 44 to stop the feeder F.

The solenoid S and the magnet N are electrically connected with a battery E or other source of energy as follows: The battery E is connected with one terminal of the solenoid S by the wire 70, the wire 71 being connected with the other terminal of the solenoid and also with the contact-piece 72, fixed to and insulated, as at 73, from the arm 12', said contact or terminal 72 coöperating with a contact-piece or circuit-controller 74, fixed to the beam-weight W and insulated therefrom, as at 75, and connected to the wire 76, which in turn is connected with the wire 77, fixed at one end to the spring contact-arm 78, mounted on the load-receiver and controlled, preferably, by the closer L', the arm 23 of which serves to hold said contact-piece against contact-piece or terminal 79, connected by the wire 80 with the battery E. When the contact-arms 74 and 72 and 78 and 79 are in contact, as illustrated in Fig. 2, the solenoid S will be energized through the connections just set forth to hold the valve V open.

The electromagnet is connected with the battery E by the following conductors: The wire 70 is connected with the wire 85, secured to one post of the magnet, the wire 86 being secured to the other portion of the magnet and also to the contact-piece or terminal 87 of the switchboard 88, fixed to the discharge-chute H', the circuit-controller of the switch 90 being pivotally supported, as at 91, to the switchboard 88 and being connected by the wire 92 with the wire 77, and when the several contact-pieces 78 and 79 and 90 and 87 are in contact the electromagnet N will be energized thereby to hold the clutch members 43 and 44 in engagement through the lever 66.

The parts being in the positions shown in Fig. 2 and the solenoid S and the magnet N being energized in the manner set forth, the larger stream of the supply will flow from the spout 31 into the load-receiver, and the feeder F will also be operated through the meshing worm-gearing, hereinbefore described, operated from the continuously-rotative shaft 40, whereby the feeder will force into the load-receiver from the supply apparatus a small stream of material, which merges with the larger stream and subsequently enters the load-receiver. When a predetermined portion of material has been received by the load-receiver, it, with the beam mechanism, will descend, the weights W and W' being elevated, and such operation will continue until the load-receiver G has received an overload, at which time the contact-piece 74 will pass off the fixed contact-piece 72, thereby deënergizing the solenoid S and the magnet N, and consequently releasing the valve V and the lever 66, the valve being shut instantly, and the pressure of material in the supply apparatus acting against the disk to force the same rearward, and consequently the clutch member 43 in a corresponding direction, to disengage said clutch member from its companion for stopping the feeder.

When the load-receiver has received an overload, the load-reducing means will commence to operate and serves to remove the surplus from the load-receiver and to discharge the same into the auxiliary hopper or conduit 95, constituting a branch of the main discharge-hopper H', and the load-reducing means includes, preferably, a screw 96, fixed to the shaft 97, mounted upon the load-receiver and operated from the electromotor M', the conductors of which are designated by 98 and 99, the former having a switch 100, mounted upon the switchboard 101, which is fixed to the discharge-chute H', the switch being adapted to make contact with the terminal 102, thereby to supply the motor M' with the necessary operating-current to rotate the screw conveyer 96.

The switch 100 is pivoted upon the switchboard 101 and is operated in one direction by the spring 104, fixed to the tailpiece of the switch and also to the switchboard, and is operated in the opposite direction by the core 105 of the solenoid S', fixed to such switchboard, and the solenoid is supported upon the switchboard 101, one of its posts being connected by the wire 106 with the contact-piece 107, which coöperates with the circuit-lever 90 and is mounted on the switchboard 88, the other post of the solenoid being connected by the wire 108 with the wire 70, which is joined to one of the poles of the battery, and the solenoid S' will be energized when the load-receiver is overloaded, so as to attract or draw in its armature, thereby to carry the switch 100 in contact with the contact-piece 102 for establishing the circuit in which the motor M' is located, so as to start said motor, and consequently the screw conveyer 96, whereby the latter can force the surplus from the load-receiver. When the surplus is withdrawn, the load will be discharged and the solenoid S' will be deënergized, so that the coiled spring 104 is operative to force the switch 100 to its ineffective position.

The actuator for the circuit-controller 91 is preferably operative with the weighing mechanism, it consisting in the present case of a depending arm 112, fixed to the load-receiver and having a notch 113 to receive the pin 114 on the circuit-controller, the pin being in contact with the lower end of the notch 114 of the actuator at the commencement of operation, as represented in Fig. 2, and the relation of the parts is such that the upper end of said notch will strike the pin when the load-receiver is overloaded and will swing the circuit-controller 90 into contact with the terminal 107, as represented in Fig. 2, thereby energizing the solenoid S' from the battery E as follows: first through the wire 80, then into the spring contact-arms 79 78, wire 77, circuit-controller 90, contact-piece 107, wire 106, solenoid S', wire 70 to battery, and the solenoid being energized the core 105 thereof will be retracted to move the switch 100 into contact with the post 102, thereby starting the motor M', and consequently the screw conveyer 96, and as the surplus is withdrawn by the operation of the screw conveyer the load-receiver will rise, and when the poising-line is reached the latch C will be positively tripped, it being preferably thrown into working connection with a device on the shaft 97, the means for throwing the two parts in engagement being preferably electrically controlled.

The latch C carries for shifting movement the worm-gear segment 120, coöperating with the worm 121 on the conveyer-shaft 97 and preferably secured to the end of the reciprocatory bar 122, mounted in ways on the latch. The segment 120 is normally held beyond the plane of the worm 121 by the coiled spring 123, embracing the bar 122 and bearing against the stop 124 thereon. The segment 120 is forced into engagement with the rotating worm 121 by the electrically-operated actuator 125, consisting, preferably, of a lever pivoted upon the load-receiver and electrically operated, the actuator or lever when operated forcing the bar 122 downward, thereby pressing the spring 123 and also throwing the segment into mesh with the worm, whereby the weighted arm 21 of the latch will be raised free of the closer-arm 23, thereby releasing the closers L and L'. When the actuator 125 releases the bar 122, the latter, and consequently the segment 120, will be returned to their primary positions by the coiled spring 123. The lever 125 is operated from the magnet N', and the armature 126 of the magnet is fixed to the lever.

One post of the magnet N' is connected by the wire 127 with the wire 108, the other post of said magnet being connected to the wire 129, fixed at its other end to the circuit-controller 130, mounted upon and insulated from the counterpoising side of the beam, the circuit-controller 130 having a spring-finger or short section of wire 131, adapted to coöperate with the circuit-controller 132, fixed to and insulated from a hanger 2 and connected with the wire 80 by a wire 133.

When the load-receiver is overloaded, the spring-finger 131 will pass to a point above the contact-piece 132, and when the surplus is withdrawn and the poising-line reached the spring-finger 131 will strike the contact-piece 132, thereby completing a circuit, in which the magnet N' is located, from the battery E to the wire 80, wire 133, contact-pieces 131 and 132, wire 129, magnet N', wire 127, and wire 108 and wire 70, so that the armature 126 will be attracted, and the lever 125, which carries the same, will be drawn downward to force the segment 120 into engagement with the worm 121, thereby to elevate the weighted arm 21 of the latch C, so as to release the closers L and L', which are then forced open by the weight of the mass in the load-receiver, and when the load is discharged the beam-weights W and W' return to their initial positions upon the arms 12 of the load-receiver. When the closer L' opens, the arm 23 thereof passes out of engagement with the spring contact-arm 78, whereby the latter can spring away from the coöperating terminal 79, so that although the contact-maker 74 returns to its primary position the circuits in which the solenoid S and magnet N are located cannot be established until the closer shuts, at which time the arm 23 will force the spring contact-arm 78 against the coöperating arm 79 to energize the solenoid and magnet, respectively, following which the valve V will be opened and the feeder F will be operated.

The operation of the hereinbefore-described machine is as follows: In Fig. 2 the parts are shown occupying their primary positions. The closers L and L' being shut and held by the latch C, which engages the closer-arm 23, and the valve V being wide open and the feeder F being in motion, the two streams constituting the supply will enter the load-receiver and when a certain amount of material is in the latter it will descend, such motion continuing until the load-receiver is overloaded, at which time the contact-arm 74 will pass off the contact-arm 72, thereby deënergizing the solenoid S and the magnet N, whereby the valve is released and can shut and whereby the disk 50 can be shifted by the material in the supply apparatus acting thereagainst, so as to force the clutch member 43 out of engagement with the coöperating clutch member 44 to stop the feeder. When the load-receiver reaches the limit of its movement, the motor M' will be operated to start the feed-conveyer 96, which is operable to force the surplus from the load-receiver into the conduit 95, and when the surplus is fully removed the latch C will be tripped, in the manner hereinbefore set forth, to release the closers L and L', which are forced open to discharge the load. On the discharge of the load the closers are shut by their counterweights 14 and 14', respectively, after which the operation is repeated.

Having described my invention, I claim—

1. The combination, with stream-supplying means, of a force-feeder; driving mechanism for said feeder; a device in position to be acted upon by the supply of material and adapted to throw the force-feeder out of action with said driving mechanism before the material leaves the stream-supplying means; and means for controlling the operation of the said device.

2. The combination, with stream-supplying means, of a force-feeder; driving mechanism for said feeder; a device in position to be acted upon by the supply of material and adapted to throw the force-feeder out of engagement with said driving mechanism before the material leaves the stream-supplying means; and means operating normally in opposition to said device.

3. The combination, with stream-supplying means, of a force-feeder; driving mechanism for the force-feeder, including a coupling device; a device in position to be acted upon by the supply of material and serving to throw one of the coupling members out of engagement with its companion and before the material leaves the stream-supplying means; and means for normally holding the members of the coupling device in engagement.

4. The combination, with stream-supplying means, of a force-feeder; a device in position to be acted upon by the supply and adapted to throw the force-feeder out of action; and electrically-operated means acting in opposition to said device.

5. The combination, with a supply apparatus including a series of spouts each of which is adapted to supply a stream of material, of a valve for controlling one of the streams; a feeder located to force the other stream from the supply apparatus; driving mechanism for said feeder; a device in position to be acted upon by the supply of material and adapted to throw the force-feeder out of action with said driving mechanism and before the material leaves the stream-supplying means; and means for controlling the operation of said device.

6. The combination, with a supply apparatus including a series of spouts each of which is adapted to supply a stream of material, of a valve for controlling one of the streams; a feeder located to force the other stream from the supply apparatus; driving mechanism for said feeder; a device in position to be acted upon by the supply and adapted to throw the force-feeder out of action with said driving mechanism; and electrically-operated means for controlling the operation of the feeder and the valve.

7. The combination, with weighing mechanism, of stream-supplying means; a force-feeder; driving mechanism for the force-feeder, including a coupling device; a device in position to be acted upon by the supply of material and serving to throw one of the coupling members out of engagement with its companion and before the material leaves the stream-supplying means; and means controlled by the weighing mechanism for normally holding the members of the coupling device in engagement.

8. The combination, with stream-supplying means, of a force-feeder; driving mechanism for the force-feeder, including a coupling device; a device in position to be acted upon by the supply and serving to throw one of the coupling members out of engagement with its companion; a shifting device for the movable clutch member; and an electromagnet one element of which is secured to the shifting device.

9. The combination, with stream-supplying means, of a force-feeder; driving mechanism for the force-feeder, including a coupling device; a device in position to be acted upon by the supply and serving to throw one of the coupling members out of engagement with its companion; a lever mounted upon the framework for shifting said coupling device; and an electromagnet one element of which is secured to the lever.

10. The combination, with a supply apparatus including a tubular spout, of a force-feeder; driving mechanism for the force-feeder, including a coupling device; means in said spout in position to be acted upon by the supply to throw one of the coupling members out of engagement with its companion; and means normally acting in opposition to the said throw-out means for holding the members of the coupling device in engagement.

11. The combination, with a supply apparatus including a cylindrical spout, of a force-feeder; driving mechanism for the force-feeder and including a coupling device; a disk in position to be acted upon by the supply and serving to throw one of the coupling members out of engagement with its companion; and means normally acting in opposition to said disk to hold the coupling members in engagement.

12. The combination, with a supply apparatus including two tubular communicating spouts, of a force-feeder located in one of the spouts; driving mechanism for the force-feeder, including a coupling device; a device in position to be acted upon by the supply and mounted in the other spout and serving to shift one of the coupling members out of engagement with its companion; and means normally acting in opposition to said coupling device to hold the movable clutch member in engagement with its companion.

13. The combination, with a supply apparatus including two tubular communicating spouts one of which is disposed in the other, of a force-feeder located in the inner spout; driving mechanism for the force-feeder, including a coupling device; a device for shifting the coupling device, located in the outer spout and in position to be acted upon by the supply; and means normally acting in opposition to said shifting device.

14. The combination, with a feeder, of a shaft to which the feeder is secured; driving mechanism for the feeder, including a clutch one member of which is fixed to the shaft; and means for shifting the shaft, thereby to move one of the clutch members out of engagement with its companion.

15. The combination, with a feed-screw, of a shaft to which the feed-screw is secured; driving mechanism for the feeder, including a clutch one member of which is fixed to the shaft; and means for shifting the shaft, thereby to move one of the clutch members out of engagement with its companion for stopping the feed-screw.

16. The combination, with a feeder, of a shaft for operating the feeder; driving mechanism for the feeder, including a coupling device one member of which is fixed to the shaft; and means for shifting the shaft, thereby to move one of the coupling members out of engagement with its companion.

17. The combination, with a feeder, of a shaft for operating the same; driving mechanism for the feeder, including a driven member fixed to the shaft; and means for shifting the shaft, thereby to throw the shaft out of operative relation with the driving mechanism.

18. The combination, with a supply apparatus including a spout, of a feeder; a shaft; driving mechanism for the feeder, including a clutch one member of which is fixed to the shaft; and a device fixed to the shaft and in position to be acted upon by the material, and adapted, when operated, to shift the shaft and thereby carry the clutch member thereof out of engagement with its companion.

19. The combination, with a supply apparatus, of a valve; a force-feeder; driving mechanism for the valve; a pair of electrical devices coöperative, respectively, with the valve and with the force-feeder for controlling the operation thereof; and means for simultaneously energizing and deënergizing said electrical devices.

20. The combination, with weighing mechanism, of stream-supplying means; a force-feeder; driving mechanism for the force-feeder, including a coupling device; means including an electromagnet for holding the movable member of the coupling device in engagement with its companion; and circuit-controlling means operative with the weighing mechanism.

21. The combination, with weighing mechanism including a load-receiver provided with a closer, of stream-supplying means; a force-feeder; driving mechanism for the force-feeder, including a coupling device; means involving an electromagnet for holding the movable member of the coupling device in engagement with its companion; and circuit-controlling means operative, respectively, with the weighing mechanism and closer.

22. The combination, with weighing mechanism including a load-receiver, of a device mounted to force material from the load-receiver; driving mechanism for said material-forcing device; load-discharging means; and mechanism for throwing the load-discharging means into operative connection with said driving mechanism.

23. The combination, with weighing mechanism including a load-receiver, of overloading means for the load-receiver; a device mounted upon the load-receiver and adapted to force the surplus therefrom; driving mechanism for said surplus-forcing device; load-discharging means; and mechanism for throwing the load-discharging means into operative connection with said driving mechanism.

24. The combination, with weighing mechanism and with means including a latch for controlling the discharge of the load, of a device mounted to force material from the load-receiver; driving mechanism for said material-forcing device; and mechanism for connecting the latch with the driving mechanism to trip said latch.

25. The combination, with weighing mechanism and with means including a latch for controlling the discharge of the load, of a shaft; gearing, one member of the gearing being carried by the latch and the other being fixed to the shaft; means for throwing the latch-gear member into engagement with the coöperating member; and means for operating the shaft.

26. The combination, with weighing mechanism and with means including a latch for controlling the discharge of the load, of overloading means for the load-receiver; a surplus-forcing device; a shaft for carrying the latter; gearing, one member of the gearing being carried by the latch and the other being fixed to the shaft; means for throwing the two members of the gearing into engagement; and means for operating the shaft.

27. The combination, with weighing mechanism and with means including a latch for controlling the discharge of the load, of a gear shiftably mounted on the latch; a shaft having a device adapted to mesh with the gear for operating the same; and means for forcing the gear into mesh with said device.

28. The combination, with weighing mechanism and with means including a latch for controlling the discharge of the load, of a device mounted to force material from the load-receiver; driving mechanism for said material-forcing device; and electrically-operated means for connecting the latch with the driving mechanism to trip said latch.

29. The combination, with weighing mechanism and with means including a latch for controlling the discharge of the load, of a shaft; gearing, one member of the gearing being carried by the latch and the other being fixed to the shaft; an actuator in position to force the latch-gear into engagement with its companion; and an electromagnet, one member of which is fixed to said actuator.

30. The combination, with weighing mechanism and with means including a latch for governing the discharge of the load, of a shaft; gearing, one member of the gearing being carried by the latch and the other being fixed to the shaft; means for operating the shaft; mechanism serving normally to hold the latch-gear out of mesh with its mate; and means acting in opposition to said mechanism.

31. The combination, with weighing mechanism and with means including a latch for governing the discharge of the load, of a shaft; gearing, one member of the gearing being carried by the latch and the other being fixed to the shaft; means for operating the shaft; a spring normally serving to throw the latch-gear out of mesh with its mate; and means acting in opposition to said mechanism.

32. The combination, with weighing mechanism including a load-receiver, of a conveyer mounted on the load-receiver; an electromotor for operating said conveyer; and electrically-operated means for starting the motor.

33. The combination, with weighing mechanism including a load-receiver and with load-discharging mechanism, of overloading means; a load-reducing device; a motor; conductors leading to the motor and having a switch; an electrically-operated device connected with the switch; means operative with the weighing mechanism for energizing said electrically-operated device; and circuit-controlling means operative with the load-discharging mechanism.

34. The combination, with weighing mechanism including a load-receiver, of overloading means for the load-receiver; a load-reducing conveyer mounted on the load-receiver; an electromotor for operating the load-reducing conveyer; conductors leading to said motors and having a switch; an electrically-operated device connected with the switch; and means for energizing said electrically-operated device.

FRANCIS H. RICHARDS.

Witnesses:
F. N. CHASE,
JOHN O. SEIFERT.